US008360329B2

(12) United States Patent
Grigg et al.

(10) Patent No.: US 8,360,329 B2
(45) Date of Patent: Jan. 29, 2013

(54) MOBILE WALLET WITH MANAGED ACTIVE AND PASSIVE PAYMENT TECHNOLOGY

(75) Inventors: David M. Grigg, Rock Hill, SC (US); Marc B. Keller, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 167 days.

(21) Appl. No.: 13/018,275

(22) Filed: Jan. 31, 2011

(65) Prior Publication Data

US 2012/0193434 A1   Aug. 2, 2012

(51) Int. Cl.
*G06K 19/06* (2006.01)
(52) U.S. Cl. ......... 235/492; 235/375; 235/380; 235/379
(58) Field of Classification Search .......... 235/375, 235/379, 380, 492
See application file for complete search history.

(56) References Cited

U.S. PATENT DOCUMENTS

| 2007/0293155 | A1 | 12/2007 | Liao et al. |
| 2008/0010215 | A1 | 1/2008 | Rackley, III et al. |
| 2008/0146148 | A1* | 6/2008 | Hulvey .......... 455/41.1 |
| 2009/0055322 | A1* | 2/2009 | Bykov et al. ......... 705/64 |
| 2010/0082481 | A1* | 4/2010 | Lin et al. .......... 705/41 |

* cited by examiner

*Primary Examiner* — Thien M Le
*Assistant Examiner* — Christle Marshall
(74) *Attorney, Agent, or Firm* — Michael A. Springs; Sreenivas Vedantam; Moore & Van Allen PLLC

(57) ABSTRACT

Embodiments of the invention are directed to apparatus, methods, and computer program products for allowing a user to make a payment at a payment terminal via a mobile device regardless of whether a power source in a mobile device is present or active. An active module of a mobile device enables a user to make a contactless payment via a mobile device when a power source in a mobile device is present and active. A passive module of a mobile device enables a user to make a contactless payment via a mobile device when a power source in a mobile device is either not present or not active. The passive module is configured to receive power from an electromagnetic field generated by a payment terminal. The mobile device is configured to manage the active and passive payment technologies by automatically activating the passive payment technology when a power source in the mobile device is not present or active.

54 Claims, 7 Drawing Sheets

LOOK-UP TABLE ASSOCIATED WITH PASSIVE MODULE IDENTIFIER: <u>CAE8985633BC246E</u>

| Payment Vehicle | Payment Vehicle Number | Name Associated with Payment Vehicle | Expiration Date | Security Code | Credit/ Debit | Default |
|---|---|---|---|---|---|---|
| American Express | 5434******** | Aaaaa Bbbbbb | 05/15 | 342 | Credit | O |
| Visa | 13414******* | Aaaaa Bbbbbb | 06/16 | 5343 | Debit | O |
| MasterCard | 34155******* | A. Bbbbbb | 07/19 | 32 | Credit | O |
| Discover | 73425******* | Bbbb Ccccccc | 09/17 | 1343 | Credit | ⊙ |
| American Express | 45255******* | Cccc Ddddd | 12/17 | 3435 | Credit | O |
| Gift Card 1 | 3434******** | Dddd Eeeee | 01/20 | - | Debit | O |
| Gift Card 2 | 5425******** | Fffff Ggggg | 02/17 | - | Debit | O |

FIG. 2

MOBILE WALLET WITH MANAGED ACTIVE AND PASSIVE PAYMENT TECHNOLOGY

BACKGROUND

A contactless payment is a payment where a customer pays a purchase amount without handing a payment card or a payment device to a cashier at the point-of-sale (POS) and without swiping the magnetic stripe of a payment card through a payment terminal (also sometimes referred to as a POS terminal). In other words, a contactless payment is one made using a payment device that wirelessly transmits payment information to the payment terminal. Although physical contact between the payment device and the payment terminal may still occur in a contactless payment environment, physical contact between the payment device and the payment terminal is not necessary for transmission of the payment information from the payment device to the payment terminal.

Many payment terminals currently have the ability to read and process electronic payment information such as credit card or debit card information received wirelessly from a mobile device (e.g., a cell phone or other handheld computer) that is brought close to the payment terminal. Mobile devices configured with contactless payment technology are often referred to as "mobile wallets" or "electronic wallets."

A mobile device having mobile wallet capabilities may allow a user to use the mobile device's interface to select a payment vehicle that the user wishes to use for paying a purchase amount. Subsequently, the mobile device may transmit payment information associated with the selected payment vehicle when the mobile device is brought close to the payment terminal. As used herein, a payment vehicle may be a payment instrument such as a credit account, debit account, bank card, or other instrument that can be used by one entity to pay another entity.

A mobile device is typically powered by a power source, such as a battery or the like, that is present in the mobile device. This power source may allow a user to perform several functions associated with a mobile device, such as making a phone call, accessing a network, executing a mobile application, making a contactless payment at a payment terminal, etc.

Sometimes, a user may forget to carry a power source for a mobile device. At other times, a power source may not be slotted properly in the mobile device. At still other times, a power source may be faulty or discharged, and consequently, the power source may not be able to supply power to the various components or modules of the mobile device. At still other times, a mobile device may simply be turned "off," and consequently, the power source may not be able to supply power to the various modules of the mobile device, including the mobile wallet module. In each of these situations, today's mobile devices may not allow a user to make a contactless payment at a payment terminal.

Without the ability to make a contactless payment at a payment terminal in each of these situations, a user who usually uses a mobile device for making a contactless payment is gravely inconvenienced. This may lead to the user having to carry other back-up payment devices in order to make a payment in each of the above situations. Moreover, a user who encounters some of the above situations more regularly than others, such as frequent travelers, may stop using their mobile device for making contactless payments altogether. Consequently, this problem with current mobile wallet technology may prevent widespread use and adoption of mobile wallets because people need to know that their payment devices are reliable.

Therefore, for all these reasons and others, there is a need for a system that may allow a user to make a contactless payment at a payment terminal in a situation where the primary power source in a mobile device is not present or not active.

BRIEF SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing an apparatus (e.g., a system, computer program product, and/or other device), method, or a combination of the foregoing for making a payment at a payment terminal via a mobile device regardless of whether a power source in a mobile device is present or active. An active module of a mobile device may enable a user to make a contactless payment via a mobile device when a power source in a mobile device is both present and active. A passive module of a mobile device may enable a user to make a contactless payment via a mobile device when a power source in a mobile device is either not present or not active.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
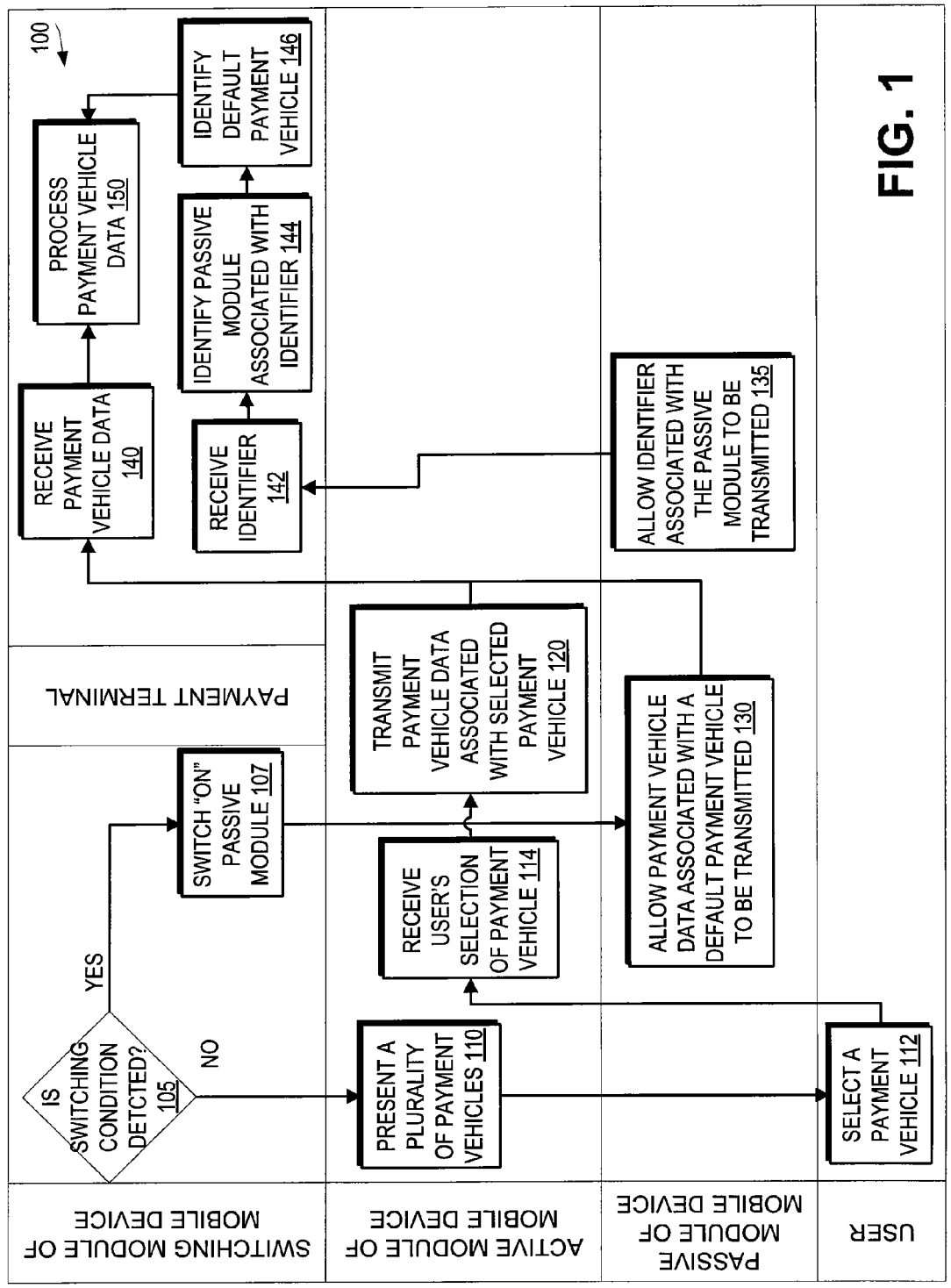
Figure 3:
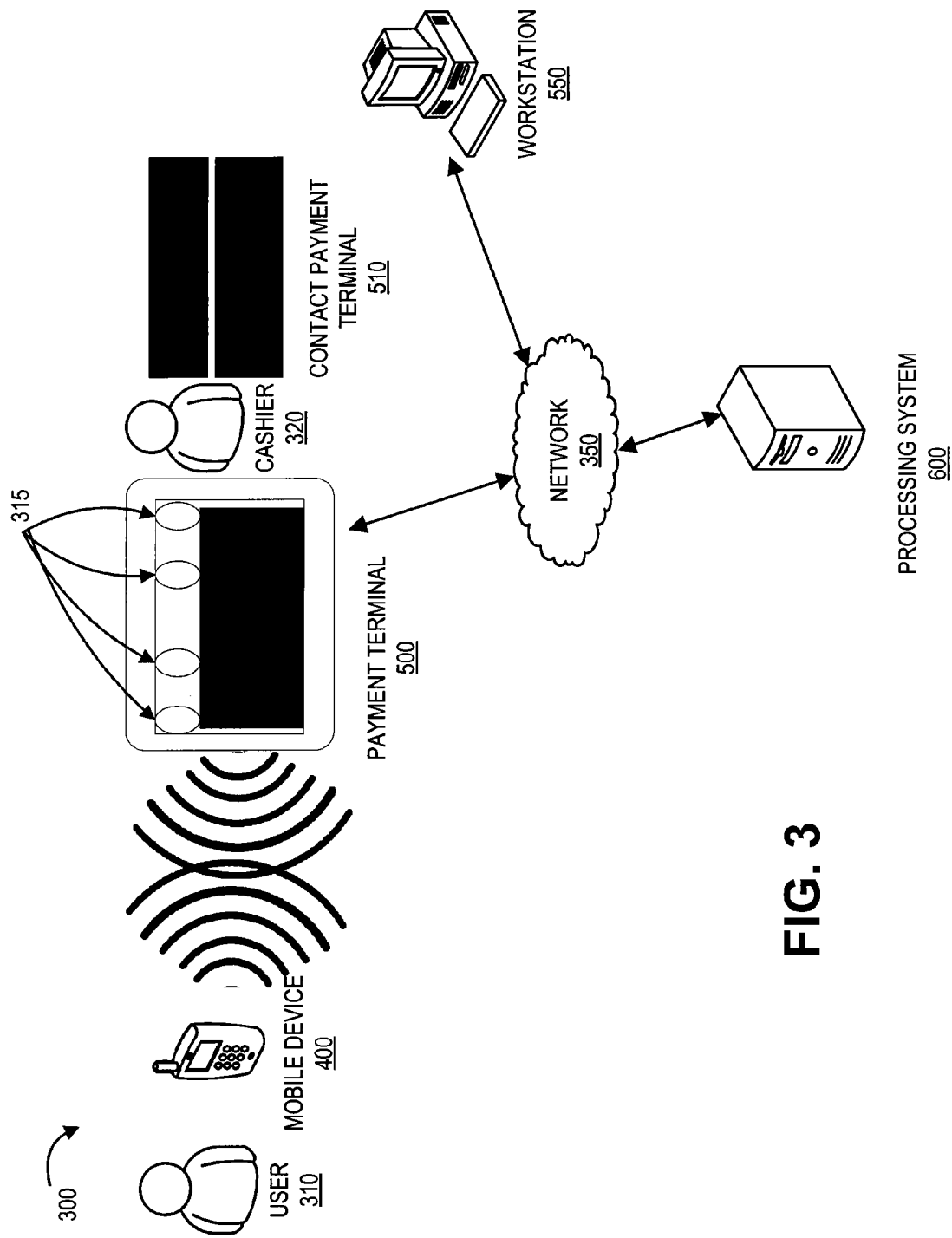
Figure 4:
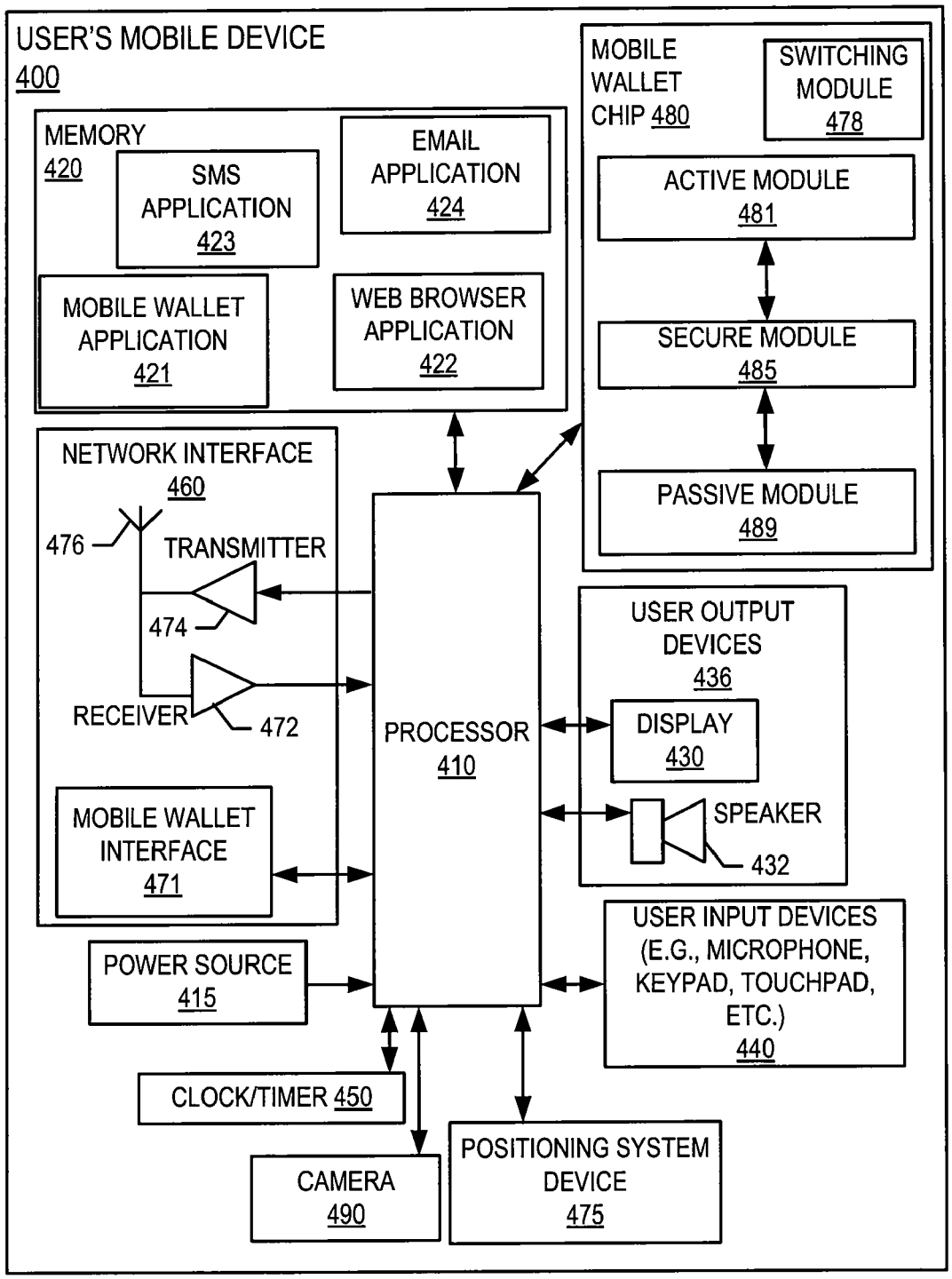
Figure 5:
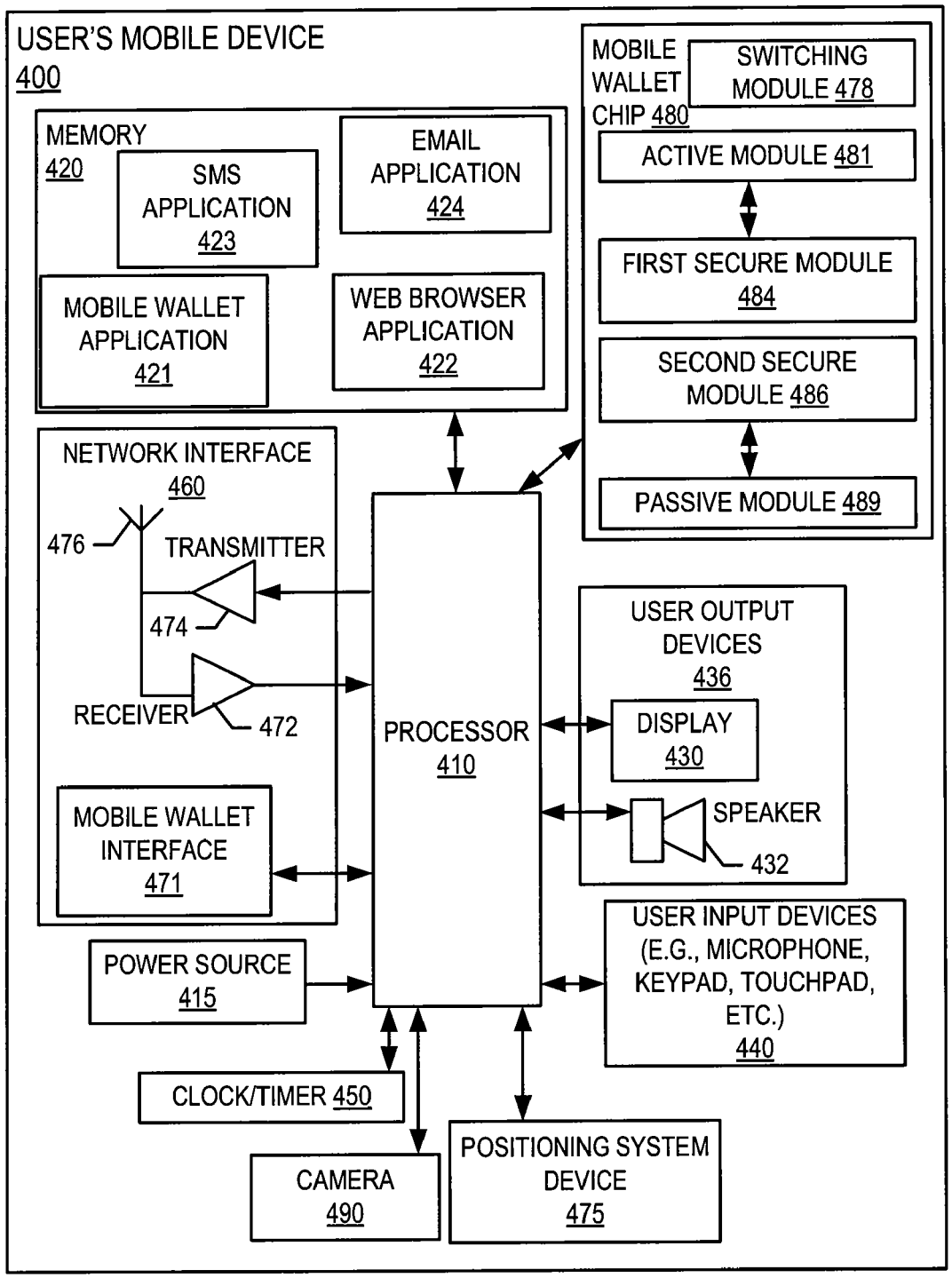
Figure 6:
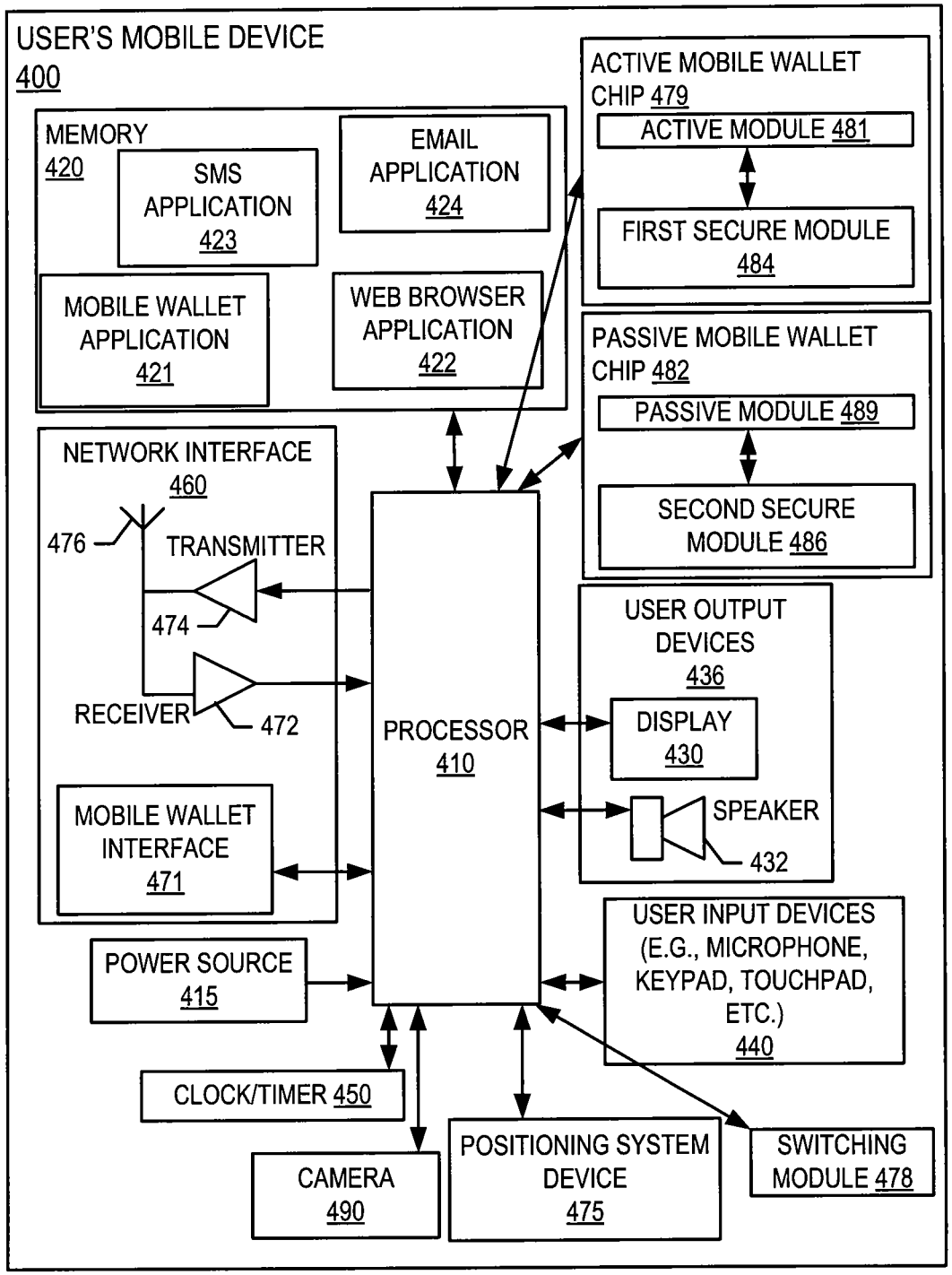
Figure 7:
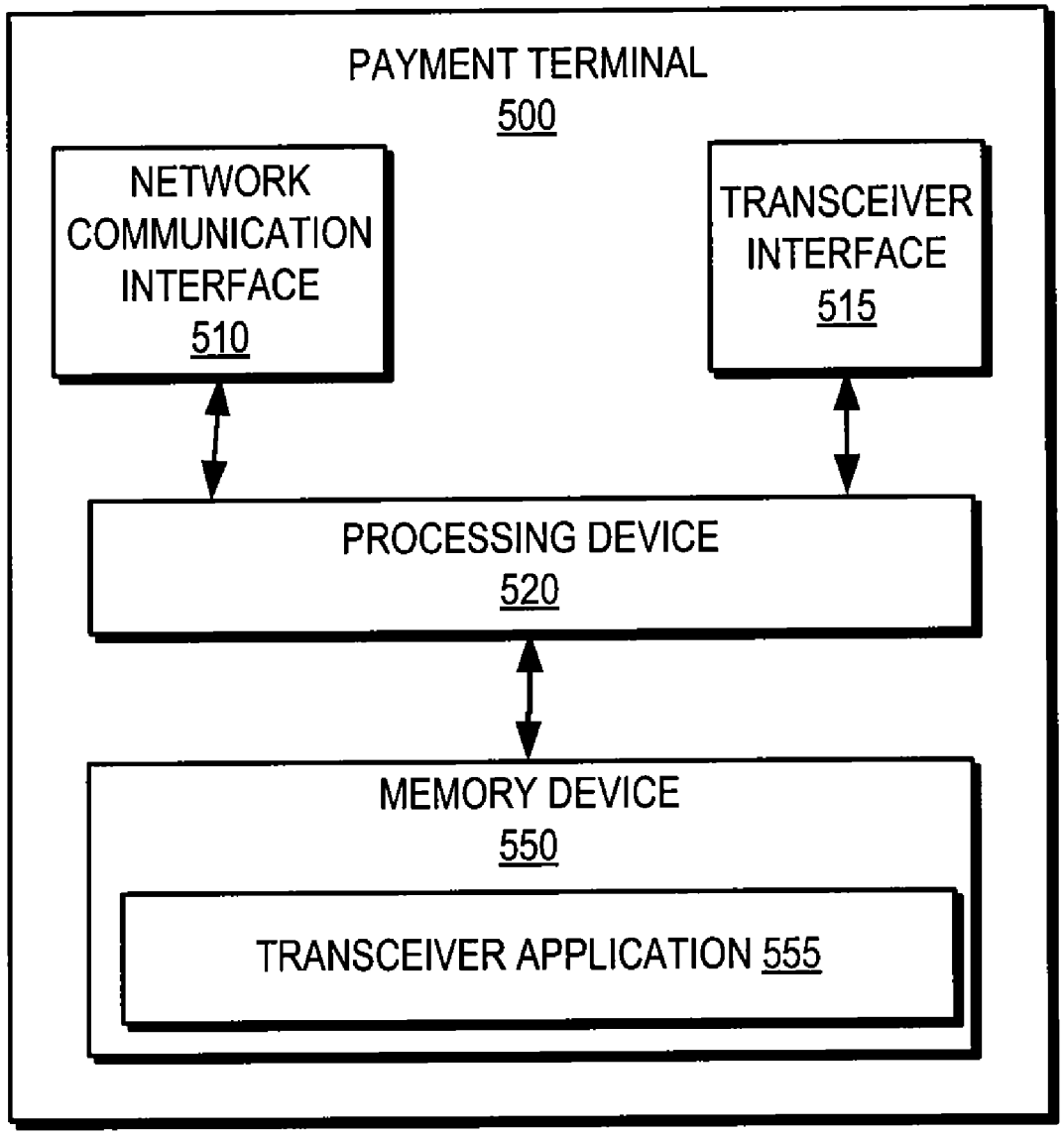

Having thus described embodiments of the invention in general terms, reference will now be made the accompanying drawings, wherein:

FIG. 1 provides a flow chart illustrating an "active" method of making a payment via an active module of a mobile device and a "passive" method of making a payment via a passive module of a mobile device;

FIG. 2 provides a look-up table that comprises payment vehicle data associated with each payment vehicle, including the default payment vehicle, in a mobile wallet;

FIG. 3 provides a block diagram illustrating a contactless payment environment, in accordance with an embodiment of the invention;

FIG. 4 provides a block diagram illustrating the mobile device of FIG. 3, in accordance with an embodiment of the invention;

FIG. 5 provides a block diagram illustrating the mobile device of FIG. 3, in accordance with another embodiment of the invention;

FIG. 6 provides a block diagram illustrating the mobile device of FIG. 3, in accordance with another embodiment of the invention;

FIG. 7 provides a block diagram illustrating the payment terminal of FIG. 3, in accordance with another embodiment of the invention

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with embodiments of the invention, the term "entity" may refer to a seller, merchant, or the like, that offers contactless payment as a method of paying for a purchase associated with the entity. In accordance with embodiments of the invention, the term "user" may refer to a customer or the like, who makes a payment at a payment terminal associated with an entity. In accordance with embodiments of the invention, the term "tapping" may refer to bringing a mobile device close to or within the proximity of a payment terminal so that information can be communicated wirelessly between the mobile device and the payment terminal using short range wireless transmission technology, such near-field communication (NFC) technology, radio-frequency (RF) technology, or the like. Tapping may include physically tapping the mobile device against an appropriate portion of the payment terminal or it may include waving or holding the mobile device near an appropriate portion of the payment terminal without making physical contact with the payment terminal. In accordance with embodiments of the invention, the term "payment vehicle" may refer to an electronic payment vehicle, such as an electronic credit or debit card. The payment vehicle may not be a "card" at all and may instead be account identifying information stored electronically in a mobile device, such as in a mobile telephone. In accordance with embodiments of the invention, the term "module" with respect to a mobile device may refer to a hardware component of a mobile device, a software component of a mobile device, or a component of a mobile device that comprises both hardware and software. In accordance with embodiments of the invention, the term "chip" may refer to an integrated circuit, a microprocessor, a system-on-a-chip, a microcontroller, or the like that may either be integrated into the mobile device or may be insertable and removable from the mobile device by a user. In accordance with embodiments of the invention, the phrase "mobile wallet" refers to the hardware and/or software in a mobile device that enables the mobile device to be used to make contactless payments at a payment terminal.

In general, embodiments of the present invention relate to systems, methods and computer program products for making a payment at a payment terminal via a mobile device regardless of whether the primary power source in a mobile device is present or active. More specifically, one embodiment of the invention enables a user to make a contactless payment at a payment terminal regardless of whether the user is able to access a mobile wallet application installed on the user's mobile device, where the mobile wallet application is configured to allow a user to wirelessly communicate payment information to a payment terminal.

The mobile wallet application is configured to help the user manage payment information stored on the mobile device and help the user to communicate payment information to the payment terminal using the correct protocol or data format. The mobile wallet application, when executed by the processor of the mobile device, typically presents the user with a graphical user interface (GUI) that allows the user to select a payment vehicle to use for a transaction from a plurality of payment vehicles stored in the mobile device, or in a mobile wallet chip that may be integrated into the mobile device. The GUI may also allow the user to set certain payment preferences or mobile wallet preferences.

In one embodiment of the invention, the user's mobile device may comprise an active module and a passive module. In one embodiment, both the active and passive modules may be integrated into a chip that may be integrated into a mobile device.

The active module may enable a user to make a contactless payment at a payment terminal when a power source in a mobile device is present and active. A power source in a mobile device may be present when the power source is properly slotted into the mobile device. A power source in a mobile device may be active when the power source is able to supply power to the active module. The power source that supplies power to the active module may also supply power to other components of the mobile device. In one embodiment, the power source that supplies power to the active module may be the only power source in the mobile device. When the power source that supplies power to the active module in a mobile device is both present and active, the user may select a payment vehicle via the mobile wallet application described above. Subsequently, the mobile device may transmit payment vehicle data of the selected payment vehicle from the mobile device to a payment terminal, wherein the power for making this transmission is supplied by a power source in the mobile device. The power source that supplies power for making this transmission may either be the same power source or a different power source from the power source that supplies power to the active module in a mobile device.

The passive module may enable a user to make a contactless payment at a payment terminal when the power source that supplies power to the active module in a mobile device is either not present or not active. A power source in a mobile device may not be present when it is either missing from the mobile device or improperly slotted into the mobile device. In one embodiment, a power source that supplies power to an active module in a mobile device may not be active when the power source is unable to supply power to the active module. In one embodiment, a power source that supplies power to the active module may not be active when the power source is unable to supply power to the active module, regardless of whether it is able to supply power to other components of the mobile device. In one embodiment, a power source that supplies power to the active module may not be active when it is unable to supply power to the active module, regardless of whether other power sources in the mobile device are able to supply power to other components of the mobile device. The power source that supplies power to the active module may be unable to supply power when the power source is faulty, when the power source is discharged, when the mobile device is turned "off," when the mobile device is dead, or the like.

When the power source that supplies power to the active module in a mobile device is either not present or not active, the passive module of the mobile device may allow a contactless payment via a default payment vehicle that is stored in the mobile device, or in a chip that is integrated into the mobile device. In one embodiment, the passive module may allow a user to make a contactless payment when all power sources in a mobile device that supply power to the active module in the mobile device are either not present or not active. The mobile device may transmit payment vehicle data associated with the default payment vehicle from the mobile device to a payment terminal, wherein the power for making this transmission may be supplied by an external source, such as the payment terminal or the like. In one embodiment, an electromagnetic field of the payment terminal may supply the power for making the transmission. Therefore, in one embodiment, there is no power source in the mobile device that may supply power to the passive module for making the transmission.

Therefore, the invention may permit a user to make a contactless payment via a mobile device even when a power source in the mobile device is not present or active.

Contactless Payment Process Flow

FIG. 1 provides a flow chart illustrating a process 100 for making a payment using either an active or passive module of a mobile device, in accordance with an embodiment of the invention. FIG. 1 illustrates the flow chart in terms of "swim lanes" associated with entities which may perform the operations in each respective swim lane. The entities illustrated in the figure are (1) a payment terminal, (2) a switching module of a mobile device, (3) an active module of a mobile device, (4) a passive module of a mobile device, and (5) a user of a mobile device. However, it should be noted that other entities could also be involved and some embodiments of the invention may not be limited to the entities illustrated in FIG. 1. Additionally, it should be understood that, in other embodiments of the invention, the entities need not be required to perform the actions illustrated in each respective swim lane. For example, some of the process steps described herein may be performed by the first entity (or other entities) even though the element may be illustrated as in the swim lane of the second entity. Similarly, in some embodiments, some of the process steps may be performed by the second entity (or other entities) even though the element may be illustrated as in the swim lane of the first entity.

Switching Condition Detection Routine and Switching Routine

In one embodiment, a mobile device may comprise a switching module. As explained in a later section, this switching module may be part of or integrated into a chip. In one embodiment, the chip is a mobile wallet chip. In some embodiments, the mobile wallet chip is integrated into the mobile device. In other embodiments, the mobile wallet chip may be insertable and removable from the mobile device by a user. In one embodiment, the switching module is separate from the mobile wallet chip. In one embodiment, the switching module may monitor the presence or absence of one or more switching conditions and execute a switching routine as described below. In some embodiments, other modules in the mobile device may execute the processes performed by the switching module.

A switching module may constantly monitor the presence or absence of one or more switching conditions at block 105 of FIG. 1. In one embodiment, a switching module may be able to monitor the presence or absence of one or more switching conditions as long as a power source in a mobile device supplies power to the switching module. The power source that supplies power to the switching module may be the same power source that supplies power to the active module of a mobile device. In one embodiment, a switching module may be a mechanical switching module that does not depend on a power source in a mobile device. In such an embodiment, the switching module may be able to constantly monitor the presence or absence of one or more switching conditions regardless of whether there is a power source in the mobile device.

In one embodiment, a switching condition may be satisfied when a power source that supplies power to an active module of the mobile device is either not present or not active.

In another embodiment, a switching condition may be satisfied when the power remaining in a power source that supplies power to an active module of the mobile device drops below a pre-determined threshold. In some embodiments, this pre-determined threshold may be set by a user of the mobile device. In some embodiments, this pre-determined threshold may be 1%. In such embodiments, the switching module may turn "off" the active module and turn "on" the passive module. In such an embodiment, if the switching module does not turn "off" the active module, the mobile device may be able to transmit payment vehicle data via both the active and passive modules until the power source that supplies power to the active module of the mobile device is discharged completely. In some embodiments, the switching module may be configured to use an interface of the mobile device to ask a user whether the user wants to activate the passive module and deactivate the active module. Therefore, in some embodiments, a user may respond that the user wants to switch from the active module to the passive module, and consequently, the switching module may turn "off" the active module and turn "on" the passive module. In some embodiments, the user may respond that the user does not want to switch from the active module to the passive module. In such embodiments, the user may continue to access the active module until the power source that supplies power to the active module is discharged completely, and once that power source is discharged completely, the passive module may turn "on" automatically, while the active module may turn "off" automatically.

In another embodiment, a switching condition may be satisfied when an active module is either not present or is dysfunctional. In an embodiment where the active module is dysfunctional, the switching module may turn "off" the active module so that the active module does not interfere with any processes performed by the passive module.

The switching conditions provided above are merely examples of some switching conditions. The number or type of switching conditions may not be limited to the conditions described above.

Turning a module "on" as described in various embodiments may comprise closing or making a circuit that supplies power from one or more power sources to the module. Turning a module "on" may also be referred to as activating a module. Therefore, a module that is "on" is active. Turning a module "off" as described in various embodiments may comprise opening or breaking a circuit that supplies power from one or more power sources to the module. Turning a module "off" may also be referred to as deactivating a module. Therefore, a module that is "off" is not active.

In one embodiment, a passive module may always be "off" unless a switching condition is detected by a switching module. If the switching module detects a switching condition at block 105, the process moves to block 107, where the switching module may execute a switching routine. In one embodiment, the switching routine may comprise the switching module turning "on" the passive module. In another embodiment, some other module or component of the mobile device may turn "on" the passive module once the switching module detects a switching condition. In another embodiment, the passive module may turn itself "on" once the switching module detects a switching condition. In another embodiment, the active module may turn "on" the passive module once the switching module detects a switching condition. In one embodiment, the switching routine may comprise the switching module turning "off" the active module. In another embodiment, some other module or component of the mobile device may turn "off" the active module once the switching module detects a switching condition that requires the active module to be turned "off." In another embodiment, the active module may turn itself "off" once the switching module detects a switching condition. In another embodiment, the passive module may turn "off" the active module once the switching module detects a switching condition that requires the active module to be turned "off."

In one embodiment, the switching module or some other module in the mobile device may detect that the switching condition which had previously been detected is no longer detected or satisfied. The switching conditions have been described previously. In such a situation, the switching module may execute a second switching routine. In one embodiment, the second switching routine may comprise the switching module turning "off" the passive module. In another embodiment, some other module or component of the mobile device may turn "off" the passive module once the switching module detects that the switching condition is no longer detected or satisfied. In another embodiment, the passive module may turn itself "off" once the switching module detects that the switching condition is no longer detected or satisfied. In another embodiment, the active module may turn "off" the passive module once the switching module detects that the switching condition is no longer detected or satisfied. In one embodiment, the second switching routine may comprise the switching module turning "on" the active module. In another embodiment, some other module or component of the mobile device may turn "on" the active module once the switching module detects that the switching condition is no longer detected or satisfied. In another embodiment, the active module may turn itself "on" once the switching module detects that the switching condition is no longer detected or satisfied. In another embodiment, the passive module may turn "on" the active module once the switching module detects that the switching condition is no longer detected or satisfied.

Active Payment Routine

In one embodiment, a mobile device may comprise an active module. As explained in a later section, this active module may be part of or integrated into a chip. In one embodiment, the chip is a mobile wallet chip. In some embodiments, the mobile wallet chip is integrated into the mobile device. In other embodiments, the mobile wallet chip may be insertable and removable from the mobile device by a user. In one embodiment, the active module executes an active payment routine as described below.

In one embodiment, the active payment routine is executed by the active module when a power source is both present and active. In one embodiment, a power source in a mobile device may be present when the power source is properly slotted into the mobile device. In one embodiment, a power source in a mobile device may be active when the power source is able to supply power to the active module. The power source that supplies power to the active module may also supply power to other components of the mobile device.

The process begins at block 110 of FIG. 1 where the mobile device may present a plurality of payment vehicles to the user. In one embodiment, a user may have previously entered information for each payment vehicle and may have directed the mobile device to store the information either locally on the mobile device or at a remote server. In one embodiment, the locally stored payment vehicles are stored in a secure module, where the secure module may be stored in the mobile wallet chip. Therefore, the mobile device may either present these locally stored payment vehicles or may dynamically access the payment vehicles from a remote server and present them to the user. In one embodiment, the mobile device may also present an option for a user to enter information for a new payment vehicle.

The process moves to block 112 of FIG. 1 where the user may select a payment vehicle. For instance, in one embodiment, the user may select Payment Card A as the payment vehicle. In one embodiment, a user may also select a gift card as the payment vehicle. In another embodiment, the user may select multiple payment vehicles and the percentage amount of the payment amount or an absolute amount to be paid from each payment vehicle.

The process then moves to block 114 where the mobile device may receive the user's selection of one or more payment vehicles. In one embodiment, the mobile device may automatically select one or more payment vehicles without presenting the one or more payment vehicles to the user and without allowing the user to select a payment vehicle. The process of automatically selecting a payment vehicle by a mobile device may be based on a pre-determined algorithm that takes into account various parameters including the place of purchase, the type of purchase, the amount of the purchase, the type of payment vehicle selected, the payment vehicle's balance, whether the payment vehicle may be used at the place of purchase, whether the payment vehicle has been used previously at the place of purchase, whether using the payment vehicle would result in earning reward points, whether using the payment vehicle would result in achieving a discount on the purchase price, whether using the payment vehicle would result in a rebate, or the like. The algorithm may be coded into a software program that may be executed by a mobile wallet application. In other embodiments, the place of purchase, type of purchase, the purchase amount, etc. may be determined when the mobile device interacts with the payment terminal, as described below, when the mobile device is tapped at or held close to the payment terminal. In another embodiment, the user may enter input into the mobile device to indicate to the mobile device the type of purchase, place of purchase, purchase amount, etc. For instance, the user may input into the mobile device the entity from which the user made a purchase (e.g., fast food restaurant) along with the type of purchase (e.g., cheeseburger meal), etc., and subsequently, the mobile device may automatically select the one or more payment vehicles based on this input.

The process then moves to block 120 where the mobile device may transmit the payment vehicle data as part of a payment vehicle data packet to the payment terminal. The mobile device must transmit data to the payment terminal in a format that is readable and processable by the payment terminal; otherwise, the user may not be able to make a contactless payment via a mobile device. The mobile device may transmit the payment vehicle data packet via any of a number of near field communication techniques.

In one embodiment, the mobile device may transmit data packets via near field communication (NFC). NFC transmission may comprise radio frequency electromagnetic waves emanating from the mobile device's transmitting antenna when the mobile device is tapped at or held or waved in close proximity to the payment terminal. When the mobile device's transmitting antenna and the payment terminal's receiving antenna are located in each other's electromagnetic field, they effectively form a transformer and data packets may be transmitted from the mobile device to the payment terminal via electromagnetic induction. Alternatively, data packets may also be transmitted from the payment terminal's transmitting antenna to the mobile device's receiving antenna when both antennas are located in each other's near electromagnetic field. In one embodiment, the near electromagnetic field for an antenna may approximately be a distance measured from the antenna up to a single wavelength distance from the antenna. In one embodiment, the transmitting and receiving antennas of the mobile device may be the same antenna. In one embodiment, the transmitting and receiving antennas of the payment terminal may be the same antenna.

In one embodiment, an encryption module at the mobile device may encrypt the data packets prior to the mobile device transmitting the data packets to the payment terminal. Encryption permits data packets to be securely transmitted to the payment terminal such that the encrypted data packets may only be decrypted by the payment terminal. In such an embodiment, the data packets may need to be decrypted by a decryption module at the payment terminal when the data packets are received at the payment terminal.

In one embodiment, the ISO/IEC 14443 standard may define the protocol associated with wirelessly transmitting data packets from the mobile device to the payment terminal. However, in other embodiments, other standards may be utilized.

In one embodiment, the mobile device may transmit to or receive data packets from the contactless payment terminal in the radio frequency band of 13.56 MHz. In other embodiments, other frequency bands of the electromagnetic spectrum may be used to transmit or receive data packets. In one embodiment, the mobile device may transmit to or receive data packets from a contactless payment terminal situated within a distance of up to 25 cm. In other embodiments, the mobile device may transmit to or receive data packets from a contactless payment terminal situated at a distance greater than 25 cm.

In one embodiment, a power source in the mobile device may provide the power required to initiate a transmission of data packets via radio frequency electromagnetic waves once the transmitting antenna of the mobile device identifies the presence of the receiving antenna at the payment terminal.

In one embodiment, a user may turn "off" the transmitting antenna of the mobile device so that even when the mobile device is tapped at or held close to the payment terminal, data packets are not transmitted from the mobile device to the payment terminal. In another embodiment, the transmitting antenna of the mobile device may always be "on" and the user may not be able to turn "off" the transmitting antenna of the mobile device.

Passive Payment Routine

In one embodiment, a mobile device may comprise a passive module. As explained in a later section, in some embodiments, this passive module may be part of or integrated into the same mobile wallet chip that comprises the active module. In other embodiments, the passive module may be part of or integrated into a mobile wallet chip that is distinct from the mobile wallet chip that comprises the active module. If the passive module is carried on a separate mobile wallet chip from the mobile wallet chip that comprises the active module, this separate mobile wallet chip may either be integrated into the mobile device or it may be insertable and removable from the mobile device by a user.

In one embodiment, the passive payment routine is executed by the passive module when a power source in a mobile device is not present or active. A power source in a mobile device may not be present when it is either missing or improperly slotted into the mobile device. In one embodiment, a power source in a mobile device may not be active when it is unable to supply power to the active module. In one embodiment, a power source in a mobile device may not be active when it is unable to supply power to the active module, regardless of whether it is able to supply power to other components of the mobile device. The power source may be unable to supply power when the power source is faulty, when the power source is discharged, when the mobile device is turned "off," when the mobile device is dead, or the like.

In one embodiment, the mobile device may, at block 130 of FIG. 1, allow payment vehicle data associated with a default payment vehicle to be transmitted when a user taps or holds or waves the user's mobile device in close proximity to the payment terminal. The payment vehicle data is transmitted from the mobile device to the payment terminal according to the embodiments described above with respect to the active payment routine. However, rather than a power source in the mobile device providing the power to initiate the transmission, a payment terminal, or some other external power source, may produce an external electromagnetic field that provides the power to allow the mobile device's transmitting antenna to initiate a transmission, via radio frequency electromagnetic waves, of payment vehicle data associated with the default payment vehicle.

In one embodiment, a user may not be able to change the payment vehicle that is designated as the default payment vehicle. However, as explained below, in other embodiments, a user may be able to change the payment vehicle that is designated as the default payment vehicle.

FIG. 2 displays an illustration of a look-up table 200 that is associated with the mobile wallet chip. In some embodiments, this look-up table is stored in a mobile wallet chip, and more particularly, in a secure module of a mobile wallet chip. As displayed in FIG. 2, the look-up table comprises payment vehicle data regarding each payment vehicle that may be used at a payment terminal. The payment vehicle data for each payment vehicle may include the payment vehicle type, the payment vehicle number, the name associated with the payment vehicle, the expiration date of the payment vehicle, the security code associated with the payment vehicle, whether the payment vehicle is a credit or debit payment vehicle, etc. Also as displayed in FIG. 2, the look-up table may indicate the payment vehicle that has been selected as the default payment vehicle 210. Also as displayed in FIG. 2, in some embodiments, there may only be a single default payment vehicle that may be selected by the user. In one embodiment, there may more than one default payment vehicle that may be selected by the user. In another embodiment, a user may establish a hierarchy of payment vehicles to serve as the default payment vehicle. In such an embodiment, the user may establish a ranking for the payment vehicles in the look-up table. In such an embodiment, the highest ranked payment vehicle may serve as the default payment vehicle when the passive module of the mobile device executes a passive payment routine.

In an embodiment where the user may be allowed to change the payment vehicle that is designated as the default payment vehicle, the user may select a radio button, or the like, for a different payment vehicle in order to change the default payment vehicle. In one embodiment where the look-up table is stored in a secure module of a mobile wallet chip, the look-up table may be accessed via the user's mobile device's mobile wallet application GUI while a power source in the mobile device is present and active. When the user changes the default payment vehicle, the change is directly made in the look-up table that may be stored in a secure module in the mobile wallet chip.

In one embodiment, the above described look-up table may not be stored in a secure module of the mobile wallet chip. In this embodiment, the look-up table is stored in a remote server and may be accessed via a network such as the Internet on a personal computer, a mobile device, some other computing platform or the like. Therefore, in this embodiment, the look-up table need not be accessed via the mobile device that comprises the mobile wallet chip. In this embodiment, when the user changes the default payment vehicle, the change is directly made in the look-up table that is stored at the remote server.

In an embodiment where the look-up table is stored in a remote server, in lieu of allowing payment vehicle data associated with the default payment vehicle to be transmitted, the mobile device may, at block 135 of FIG. 1, allow an identifier or the like, associated with the passive module, to be transmitted when the user taps or holds or waves the mobile device in close proximity to the payment terminal. In an embodiment where the passive module is an RFID tag or sticker, this identifier is a unique identifier that identifies the passive module that is stored in the user's mobile device. This unique identifier is also associated with the look-up table that is stored in a remote server. In one embodiment the identifier is a numeric code, alphanumeric code, hexadecimal code, binary code, or the like.

Receipt of Payment Vehicle Data

In an embodiment where the payment terminal receives a payment vehicle data packet, the process then moves to block 140 of FIG. 1 where the payment terminal may receive a payment vehicle data packet from the user's mobile device. In one embodiment, the payment terminal may indicate that it has received the payment vehicle data packet by producing an audible beep. In another embodiment, the payment terminal may indicate that it has received the payment vehicle data packet by changing the color associated with one or more light emitting diodes (LEDs) that are situated on the payment terminal or by switching one or more LEDs from an "off" state to an "on" state. The method by which the payment terminal may indicate that it has received the payment vehicle data packet is not limited to these embodiments. In one embodiment, the payment terminal may not indicate, at all, that it has received the payment vehicle data packet.

Subsequently, in one embodiment, the payment terminal may identify the payment vehicle data packet by identifying the protocol associated with the payment vehicle data packet. For instance, if the received payment vehicle data packet protocol is identified as a first type of protocol, the received payment vehicle data is Payment Card A payment vehicle data. If the received payment vehicle data packet protocol is identified as a second type of protocol, the received payment vehicle data is Payment Card B payment vehicle data. If the received payment vehicle data packet protocol is identified as a third type of protocol, the received payment vehicle data is Payment Card C payment vehicle data. If the received payment vehicle data packet protocol is identified as a fourth type of protocol, the received payment vehicle data may be gift card data.

Subsequently, the payment terminal may determine whether the payment vehicle data constitutes a valid payment vehicle. The rules that define whether the payment vehicle data constitutes a valid payment vehicle may be set by the entity from which the user makes a purchase. For instance, the algorithm that defines the payment vehicle validation process may comprise determining whether the payment vehicle has expired, whether the payment vehicle is accepted by the entity, whether the payment vehicle may be used for this purchase, or the like.

If the payment terminal determines that the payment vehicle data is not valid, the payment terminal may generate and present a message to the user. In an embodiment, the payment terminal may also present the reason why the payment vehicle is not an accepted form of payment. In an embodiment, the payment terminal may also allow the user to attempt the transaction with another payment vehicle.

Receipt of Identifier Associated with Passive Module

In an embodiment where the mobile device transmits an identifier associated with the passive module rather than a payment vehicle data packet, the process moves from block 135 to block 142 of FIG. 1 where the payment terminal may receive an identifier associated with the passive module. In one embodiment, the mobile device may transmit the identifier in a data packet that is readable and processable by the payment terminal. For the data packet to be readable and processable by the payment terminal, the data packet must be associated with a data protocol that is readable and processable by the payment terminal.

In one embodiment, the payment terminal may indicate that it has received the identifier by producing an audible beep. In another embodiment, the payment terminal may indicate that it has received the identifier by changing the color associated with one or more light emitting diodes (LEDs) that are situated on the payment terminal or by switching one or more LEDs from an "off" state to an "on" state. The method by which the payment terminal may indicate that it has received the identifier is not limited to these embodiments. In one embodiment, the payment terminal may not indicate, at all, that it has received the identifier.

Subsequently, in one embodiment, the payment terminal may, at block 144 of FIG. 1, identify the passive module associated with the identifier by accessing a table of identifiers. Subsequently, the payment terminal may access the look-up table associated with the identified passive module. Subsequently, the payment terminal may, at block 146 of FIG. 1, identify from the look-up table the default payment vehicle selected by the user by accessing the previously described look-up table that is stored in a remote server.

Subsequently, the payment terminal may determine whether the payment vehicle data constitutes a valid payment vehicle. The rules that define whether the payment vehicle data constitutes a valid payment vehicle may be set by the entity from which the user makes a purchase. For instance, the algorithm that defines the payment vehicle validation process may comprise determining whether the payment vehicle has expired, whether the payment vehicle is accepted by the entity, whether the payment vehicle may be used for this purchase, or the like.

If the payment terminal determines that the payment vehicle data is not valid, the payment terminal may generate and present, via a display, a message to the user. In an embodiment, the payment terminal may also present, via a display, the reason why the payment vehicle is not an accepted form of payment. In an embodiment, the payment terminal may ask the user, via a display, whether the user would like to complete the transaction with another payment vehicle that is in the look-up table which is stored in a remote server. Subsequently, the payment terminal via allow the user to select, via a display associated with the payment terminal, an alternate payment vehicle that is stored in the look-up table.

Processing of Payment Vehicle Data

If the payment terminal determines that the identified payment vehicle data is valid, the payment terminal may process the payment vehicle data at block 150 of FIG. 1. In one embodiment, processing the payment vehicle data may comprise transmitting the payment vehicle data to a processing system from where the payment vehicle data may be routed to the entity's processing financial institution for authorization of payment vehicle data, capture of electronic funds from the source authorized by the payment vehicle, and deposit of electronic funds into a destination account specified by the entity. In some embodiments, the processing system may prompt the payment terminal to request the user to authorize payment via the payment vehicle, e.g., requesting the user for a digital signature on a touchpad associated with the payment terminal, on an electronic receipt, on a paper receipt, or the like. In some embodiments, the processing system may prompt the payment terminal to request the user to authorize payment via the payment vehicle if the payment amount is above a certain threshold amount.

Contactless Payment System and Environment

FIG. 3 provides a block diagram illustrating a contactless payment environment 300 configured for making a contactless payment via a mobile device, in accordance with an embodiment of the invention. As illustrated in FIG. 3, the contactless payment environment may include a mobile device 400 operable by a user 310 who may be a customer who wants to make a contactless payment via a mobile device. The contactless payment environment may also include a payment terminal 500 that may be automated or may be operable by a cashier 320. The payment terminal may permit a user to make a contactless payment with a payment device such as the mobile device 400.

In some embodiments, the environment 300 may also include a contact payment terminal 510 that may permit a user to make a payment via a contact payment device such as a payment card that has a magnetic stripe which may be swiped through the contact payment terminal 510.

The contactless payment environment may also include a workstation 550 and a processing system 600 that are in electronic communication with the payment terminal via a network 350, which may be the Internet, an intranet or the like. The LEDs 315 situated on the payment terminal that perform the functions described above are also displayed in FIG. 3.

In FIG. 3, the network 350 may include a local area network (LAN), a wide area network (WAN), and/or a global area network (GAN). The network 350 may provide for wireline, wireless, or a combination of wireline and wireless communication between devices in the network. In one embodiment, the network 350 includes the Internet. In one embodiment, the network 350 may include a wireless telephone network.

The mobile device 400 and the payment terminal 500 are described in further detail below.

FIG. 4 displays an embodiment of a mobile device that may be configured to make a contactless payment at a payment terminal 500. As used herein, a "mobile device" 400 may be any mobile communication device, such as a cellular telecommunications device (i.e., a cell phone or mobile phone), personal digital assistant (PDA), a mobile Internet accessing device, or other mobile device.

In one embodiment of the invention, the mobile device 400 may be a mobile telephone. However, it should be understood, however, that a mobile telephone is merely illustrative of one type of mobile device 400 that may benefit from, employ, or otherwise be involved with embodiments of the present invention and, therefore, should not be taken to limit the scope of embodiments of the present invention. Other types of mobile devices 400 may include portable digital assistants (PDAs), pagers, mobile televisions, gaming devices, laptop computers, cameras, video recorders, audio/video player, radio, GPS devices, any combination of the aforementioned, or the like.

The mobile device 400 may generally include a processor 410 communicably coupled to such devices as a memory 420, user output devices 436, user input devices 440, a network interface 460, a power source 415, a clock or other timer 450, a camera 490, a positioning system device 475, a mobile wallet chip 480, etc. The processor 410, and other processors described herein, may generally include circuitry for implementing communication and/or logic functions of the mobile device 400. For example, the processor 410 may include a digital signal processor device, a microprocessor device, and various analog to digital converters, digital to analog converters, and/or other support circuits. Control and signal processing functions of the mobile device 400 may be allocated between these devices according to their respective capabilities. The processor 410 thus may also include the functionality to encode and interleave messages and data prior to modulation and transmission. The processor 410 may additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the mobile device 400 to transmit and receive web content, such as, for example, location-based content and/or other web page content, according to a Wireless Application Protocol (WAP), Hypertext Transfer Protocol (HTTP), and/or the like. The processor 410 may also be capable of operating a client application, such as a mobile wallet application that is represented by block 421.

As shown in FIG. 4, in one embodiment of the invention, the mobile wallet application 421 may be downloaded from an application server and stored in the mobile device's memory 420. In another embodiment, the mobile wallet application may be pre-installed and stored in a memory in the mobile wallet chip 480. In such an embodiment, the user may not need to download the mobile wallet application 421 from an application server. In some embodiments, the mobile wallet application 421 may have a graphical user interface (GUI) that allows the user to perform various processes as described below. The GUI may also allow the user to set certain payment preferences or mobile wallet preferences.

In one embodiment, the mobile wallet application 421 may provide the software capability for the active module 481 and the passive module 489 to enable those modules to perform the various process blocks of FIG. 1. In one embodiment, the mobile wallet application 421 may even provide the software capability for the switching module 478 to enable the switching module 478 to perform the various process blocks of FIG. 1.

In one embodiment, the mobile wallet application 421 may be capable of interacting with or enabling the active module to present to a user one or more payment vehicles that may be stored in the secure module 485. The mobile wallet application 421 may also be capable of interacting with or enabling the active module 481 to automatically select one or more payment vehicles or receive a user's selection of one or more payment vehicles. The mobile wallet application 421 may also be capable of allowing a user to input information for new payment vehicles, or downloading payment vehicle information, via a network, from a user's account associated with a payment vehicle.

In one embodiment during an active payment routine, the mobile wallet application 421 may be capable of working in conjunction with the mobile device's hardware to transmit payment vehicle data associated with a payment vehicle selected by a user to a payment terminal according to embodiments described above. In one embodiment during a passive payment routine, the mobile wallet application 421 may also be capable of working in conjunction with the mobile device's hardware to allow either an identifier associated with the passive module 489 or payment vehicle data associated with a default payment vehicle to be transmitted to a payment terminal according to embodiments described above.

The mobile wallet chip may comprise a switching module 478 that performs the various process blocks described with respect to FIG. 1. In one embodiment, the switching module 478 may be integrated into the mobile wallet chip 480. The switching module 478 may be capable of interacting with the active module 481, the secure module 485, and the passive module 489. In some embodiments, the switching module 478 may be part of the mobile device, though not integrated into the mobile wallet chip 480. In one embodiment, the switching module 478 may be integrated into the active module 481 or the passive module 489.

The mobile wallet chip 480 may comprise an active module 481, a secure module 485, and a passive module 489. In one embodiment, the mobile wallet chip 480 may be an integrated circuit, a microprocessor, a system-on-a-chip, a microcontroller, or the like. In one embodiment, the active module 481 may be an active Near Field Communication (NFC) device. The active module 481 is "active" because a power source in the mobile device supplies the power for transmitting payment vehicle data associated with a payment vehicle selected by the user. In one embodiment, the passive module 489 may be a passive NFC device. The passive module 489 is "passive" because no power source in the mobile device supplies the power for transmitting payment vehicle data associated with the default payment vehicle.

The secure module 485 may be a memory device in the mobile wallet chip 480. In one embodiment the secure module 485 may comprise payment vehicle data associated with a plurality of payment vehicles. For instance, FIG. 2 comprises data that may be stored in the secure module 485. Therefore, in one embodiment, payment vehicle data for each payment vehicle that is stored in the secure module 485 may include the payment vehicle type, the payment vehicle number, the name associated with the payment vehicle, the expiration date of the payment vehicle, the security code associated with the payment vehicle, whether the payment vehicle is a credit or debit payment vehicle, etc. Therefore, in an embodiment, the secure module 485 may comprise data indicating whether a payment vehicle is a default payment vehicle. As indicated earlier, in one embodiment, only a single payment vehicle may be selected as the default payment vehicle. Since the secure module 485 is stored in a memory in the mobile wallet chip 480 and not in a memory in the mobile device, the user may be able to transfer the mobile wallet chip 480, if the mobile wallet chip 480 is not integrated into the mobile device, to another mobile device and the user may consequently have access to the payment vehicles in the mobile wallet chip 480 on a different mobile device.

In embodiments where payment vehicle data associated with a default payment vehicle, rather than an identifier associated with the passive module 489, is transmitted to a payment terminal when the passive routine is executed, the secure module 485 may store the payment vehicle data in the form of a look-up table as displayed in FIG. 2. In such an embodiment, the secure module 485 may allow a user to change the payment vehicle that serves as the default payment vehicle by allowing the user to access the look-up table via a mobile wallet application 421 when a power source in the mobile device that supplies power to a processor that executes the mobile wallet application 421 is present and active. In one embodiment, the power source that supplies power to the active module 481, as described below, may be the same power source that supplies power to a processor that executes the mobile wallet application 421.

In embodiments where an identifier associated with the passive module 489, rather than payment vehicle data associated with a default payment vehicle, is transmitted when the passive routine executed, a remote server may store the payment vehicle data in the form of a look-up table as displayed in FIG. 2. As explained in an earlier section, in some embodiments, a user may change the payment vehicle that serves as the default payment vehicle by accessing the look-up table, via a network such as the Internet, on a computing platform such as a personal computing device, a mobile computing device, or the like.

The active module 481 may enable a user to make a contactless payment at a payment terminal when a power source in a mobile device is present and active. A power source in a mobile device may be present when the power source is properly slotted into the mobile device. A power source in a mobile device may be active when the power source is able to supply power to the active module 481. The power source that supplies power to the active module 481 may also supply power to other components of the mobile device. In one embodiment, the power source that supplies power to the active module 481 may be the only power source in the mobile device.

When the power source that supplies power to the active module 481 in a mobile device is both present and active, the user may select a payment vehicle via the mobile wallet application 421 described above. Subsequently, the mobile device may transmit to a payment terminal, payment vehicle data associated with the selected payment vehicle that is stored in the mobile device, or, more specifically, in the secure module 485 of the mobile wallet chip 480, wherein the power for making this transmission is supplied by a power source in the mobile device. The power source that supplies power for making this transmission may either be the same power source or a different power source from the power source that supplies power to the active module 481 in a mobile device.

The passive module 489 may enable a user to make a contactless payment at a payment terminal when the power source that supplies power to the active module 481 in a mobile device is either not present or not active. A power source in a mobile device may not be present when it is either missing from the mobile device or improperly slotted into the mobile device. In one embodiment, a power source that supplies power to the active module 481 in a mobile device may not be active when the power source is unable to supply power to the active module 481. In one embodiment, a power source that supplies power to the active module 481 in a mobile device may not be active when the power source is unable to supply power to the active module 481, regardless of whether it is able to supply power to other components of the mobile device. In one embodiment, a power source that supplies power to the active module 481 may not be active when it is unable to supply power to the active module 481, regardless of whether other power sources in the mobile device are able to supply power to other components or modules of the mobile device. The power source that supplies power to the active module 481 may be unable to supply power when the power source is faulty, when the power source is discharged, when the mobile device is turned "off," when the mobile device is dead, or the like. In one embodiment, the passive module 489 may be deactivated when the power source that supplies power to the active module 481 is both present and active. This may prevent payment vehicle data associated with the default payment vehicle or an identifier associated with the passive module 489 to be accidentally transmitted from the mobile device to an apparatus such as a payment terminal. In such an embodiment, even though the passive module 489 may be deactivated, a user may still be able to access a look-up table to change the payment vehicle that serves as the default payment vehicle, as described in earlier embodiments.

When the power source that supplies power to the active module 481 in a mobile device is either not present or not active, the passive module 489 of the mobile device may allow a contactless payment via a default payment vehicle that is stored in the mobile device, or, more specifically, in the secure module 485 of the mobile wallet chip 480. In one embodiment, the passive module 489 may allow a user to make a contactless payment when all power sources in a mobile device that supply power to the active module 481 in the mobile device are either not present or not active.

In order to make a payment during the passive payment routine, the mobile device may transmit payment vehicle data associated with the default payment vehicle, or an identifier associated with the passive module 489 as described above, from the mobile device to a payment terminal, wherein the power for making this transmission may be supplied by an external source, such as the payment terminal or the like. In one embodiment, an electromagnetic field of the payment terminal may supply the power for making the transmission. Therefore, in one embodiment, there is no power source in the mobile device that may supply power to the passive module 489 for making the transmission.

However, in another embodiment, a solar or photovoltaic power source in the mobile device may be activated when a power source that supplies power to the active module 481 is either not present or not active. In one embodiment, the solar power source may be a solar cell, a photovoltaic cell, or the like. This solar power source may have been charged by sunlight when the mobile device was previously exposed to sunlight or some other form of radiation depending on the type of photovoltaic power source. The solar power source may supply power to the passive module 489 that may allow the mobile device to make a contactless payment via a default payment vehicle that is stored in the mobile device, or in the secure module 485 of the mobile wallet chip 480, or via an identifier associated with the passive module 489. In some embodiments, the solar power source may also supply power to other components of the mobile device, but the solar power source may not supply power to the active module 481 of the mobile wallet chip 480. Therefore, in an embodiment where a solar power source supplies power to the passive module 489, the electromagnetic field of the payment terminal may not supply power to the passive module for transmitting payment vehicle data associated with the default payment vehicle during the passive payment routine.

The processor 410 may be configured to use the network interface 460 to communicate with one or more other devices on the network 350. In this regard, the network interface 460 may include an antenna 476 operatively coupled to a transmitter 474 and a receiver 472 (together a "transceiver"). The processor 410 may be configured to provide signals to and receive signals from the transmitter 474 and receiver 472, respectively. These signals may include radio frequency signals emanating from the mobile device's transmitter 474 when the mobile device is tapped at or held or waved in close proximity to the payment terminal. These signals may also include radio frequency signals received at the mobile device's receiver 472 when the mobile device is tapped at or held or waved in close proximity to the payment terminal. In one embodiment, these radio frequency signals may be transmitted and received in the radio frequency band of 13.56 MHz. In one embodiment, the ISO/IEC 14443 standard may define the protocol associated with the data carried by these radio frequency signals. In one embodiment, the transmitter 474 and receiver 472 at the mobile device may transmit and receive radio frequency signals, respectively, from a payment terminal within a distance of up to 25 cm.

As indicated earlier, the processor 410 may be configured to provide signals to and receive signals from the transmitter 474 and receiver 472, respectively. The signals may also include signaling information in accordance with the air interface standard of the applicable cellular system of the wireless telephone network that may be part of the network 350. In this regard, the mobile device 400 may be configured to operate with one or more air interface standards, communication protocols, modulation types, and access types. By way of illustration, the mobile device 400 may be configured to operate in accordance with any of a number of first, second, third, and/or fourth-generation communication protocols and/or the like. For example, the mobile device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 400 may also be configured to operate in accordance with non-cellular communication mechanisms, such as via a wireless local area network (WLAN) or other communication/data networks.

The network interface 460 may also include a mobile wallet interface 471 in order to allow a user to execute some or all of the above-described processes with respect to the mobile wallet application 421 and the active 481 and passive 489 modules of the mobile wallet chip 480. The mobile wallet interface 471 may have access to the hardware, e.g., the transceiver, and software previously described with respect to the network interface 460.

In one embodiment, the mobile device may comprise a first transceiver that works in conjunction with the active module 481 of the mobile device and a second transceiver that works in conjunction with the passive module 489. Therefore, the antenna and other hardware or software that transmit payment vehicle data from the active module 481 of the mobile device may be separate from the antenna and other hardware or software that allows payment vehicle data from the passive module 489 of the mobile device to be transmitted to a payment terminal. In one embodiment, the transceiver and other hardware for transmitting payment vehicle data from the active module 481 may be integrated into the active module 481. In one embodiment, the transceiver and other hardware that allows payment vehicle data from the passive module 489 of the mobile device to be transmitted may be integrated into the passive module 489.

As described above, the mobile device 400 may have a user interface that includes user output devices 436 and/or user input devices 440. The user output devices 436 may include a display 430 (e.g., a liquid crystal display (LCD) or the like) and a speaker 432 or other audio device, which are operatively coupled to the processor 410. The user input devices 440, which may allow the mobile device 400 to receive data from a user such as the user 110, may include any of a number of devices allowing the mobile device 400 to receive data from a user, such as a keypad, keyboard, touch-screen, touchpad, microphone, mouse, joystick, other pointer device, button, soft key, and/or other input device(s).

The mobile device 400 may further include a power source 415. In one embodiment, a power source 415 is a device that supplies electrical energy to an electrical load. In one embodiment, a power source 415 may convert a form of energy such as solar energy, chemical energy, mechanical energy, etc. to electrical energy. In one embodiment, a power source 415 in a mobile device may be a battery, such as a lithium battery, a nickel-metal hydride battery, or the like, that is used for powering various circuits, e.g., the transceiver circuit, and other devices that are used to operate the mobile device 400. In some embodiments, the power source 415 may also supply power to the active module 481 of the mobile wallet chip 480. In some embodiments, the power source 415 may be a power adapter that can connect a power supply from a power outlet to the mobile device 400. In some embodiments, a power adapter may be classified as a power source "in" the mobile device.

As described previously, in some embodiments, the mobile device 400 may include a solar power source, such as a solar cell, a photovoltaic cell, or the like, that may be used to supply power to the passive module 489 of the mobile wallet chip 480 in order for the passive module 489 to execute the passive payment routine.

Embodiments of the mobile device 400 may also include a clock or other timer 450 configured to determine and, in some cases, communicate actual or relative time to the processor 410 or one or more other devices.

The mobile device 400 may also include a memory 420 operatively coupled to the processor 410. As used herein, memory may include any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory may additionally or alternatively include an electrically erasable programmable read-only memory (EEPROM), flash memory or the like.

The memory 420 may store any of a number of applications which comprise computer-executable instructions/code executed by the processor 410 to implement the functions of the mobile device 400 described herein. For example, the memory 420 may include such applications as a web browser application 422 and a mobile wallet application 421. The mobile wallet application 421 may be capable of performing one or more functions described above. These applications may also typically provide a graphical user interface (GUI) on the display 430. For instance, as described previously, the GUI for the mobile wallet application 421 may allow the user 110 to enter input to select a payment vehicle to transmit to a payment terminal. In some embodiments, the GUI for the mobile wallet application 421 may also allow the user 110 to change the payment vehicle that serves as the default payment vehicle associated with the passive module 489. Alternatively, the GUI for the web browser application 422 may also allow the user 110 to change the default payment vehicle associated with the passive module 489 by allowing the user to access a look-up table from a remote server, as discussed previously with respect to an embodiment of the invention.

The memory 420 may also store any of a number of pieces of information, and data, used by the mobile device 400 and the applications and devices that make up the mobile device 400 or are in communication with the mobile device 400 to implement the functions of the mobile device 400 and/or the other systems described herein. For example, the memory 420 may include such data as user authentication information to gain access to the mobile wallet application 421, user authentication information for each payment vehicle that is stored by or accessible via the mobile wallet application 421, user authentication information to access the secure module 485 of the mobile wallet chip 480, etc. In other embodiments, this authentication information may be stored in a memory of the mobile wallet chip 480.

FIG. 5 displays an illustration of an alternate embodiment of a mobile device 400 where the mobile wallet chip 480 may comprise an active module 481, a first secure module 484, a second secure module 486, and a passive module 489. Both the active 481 and passive 489 modules have been described in previous embodiments. The mobile wallet chip may also comprise a switching module 478 that has been described previously.

The first secure module 484 may comprise payment vehicle data associated with a plurality of payment vehicles. These payment vehicles may be the plurality of payment vehicles presented to the user by the active module 481 when the active module 481 executes the active payment routine as described earlier. In one embodiment, the first secure module 484 may not comprise data indicating whether any of the payment vehicles is the default payment vehicle. The active module 481 may access payment vehicle data associated with a plurality of payment vehicles stored in the first secure module 484 when the active module 481 executes the active payment routine.

In the embodiment displayed in FIG. 5, the passive module 489 may interact with the second secure module 486 that is stored in a memory in the mobile wallet chip 480. The second secure module 486 may comprise payment vehicle data for a default payment vehicle. In one embodiment, the default payment vehicle may be one of the payment vehicles that is stored in the first secure module 484; however, the first secure module 484 may not comprise data indicating that this payment vehicle is the default payment vehicle. The passive module 489 may access payment vehicle data associated with a default payment vehicle stored in the second secure module 486 when the passive module 489 executes the passive payment routine.

FIG. 6 displays an illustration of a further alternate embodiment of a mobile device 400 that comprises an active mobile wallet chip 479 and a passive mobile wallet chip 482. The active mobile wallet chip 479 may comprise an active module 481 and a first secure module 484, both which have been described in previous embodiments. The passive mobile wallet chip 482 may comprise a passive module 489 and a second secure module 486, both which have been described in previous embodiments.

In FIG. 6, the switching module 478 is depicted as being present outside either mobile wallet chip. However, in other embodiments, the switching module 478 may be located in the passive mobile wallet chip 482, wherein the switching module in the passive mobile wallet chip may turn "on" the passive module 489 when one or more switching conditions are detected by the switching module 478. In one embodiment, there may be a switching module located in the active mobile wallet chip 479 and a separate switching module located in the passive mobile wallet chip 482. In some embodiments, as described previously, the active module 481 may need to be turned "off" by a switching module, and in such embodiments, the switching module in the active mobile wallet chip 479 may be able to turn "off" the active module 481, while the switching module in the passive mobile wallet chip 482 may be able to turn "on" the passive module 489. In some embodiments, one or more switching modules may be located in the mobile device, either inside or outside one or more mobile wallet chips, and these one or more switching modules may be able to turn "on" and turn "off" one or more active modules or one or more passive modules in the mobile device.

FIG. 7 displays an embodiment of a payment terminal 500 that is displayed in FIG. 3. The payment terminal 500 may include various features, such as a network communication interface 510, a processing device 520, a transceiver interface 515, and a memory device 550 that may include a transceiver application 555.

As used with respect to the payment terminal 500, a "communication interface" may generally include a modem, server, transceiver, and/or other device for communicating with other devices on a network. The network communication interface may be a communication interface having one or more communication devices configured to communicate with one or more other devices in the contactless payment environment 300, such as the mobile device 400, the workstation 550, the processing system 600, other processing systems, data systems, etc.

In one embodiment, the transceiver interface 515 is a separate module that may generally include a transceiver, i.e., one or more antennas and/or other electronic circuitry, devices, and software, for receiving electronic payment vehicle data when the mobile device is held close to or tapped at the payment terminal. Data received by the processing device 520 may be used to execute the various process blocks of the payment terminal, as described above with respect to FIG. 1. In other embodiments, the transceiver interface 515 is part of the network communication interface 510. In some embodiments, the transceiver interface 515 may also be used as an interface to send data to the mobile device 400 when the mobile device 400 is held close to or tapped at the payment terminal. In some embodiments, the transceiver interface 515 may provide an electromagnetic field that may supply power to the passive module 489 of a user's mobile device.

An output device for the transceiver interface 515 may include a display that provides instructions regarding the steps for making a contactless payment. In some embodiments where the payment terminal requests the user's signature, the display may also serve as a touchpad input device to input the user's signature via a stylus. Other output devices may include one or more LEDs or an audio speaker, both which may indicate to the user that data has been successfully received from the mobile device 400. A printer that can print paper receipts may also be incorporated into the payment terminal. Other embodiments of the payment terminal may carry other input and output devices, such as a mouse, keyboard, button, touchpad, touch screen, microphone, speaker, light, joystick, switch, or the like.

As used with respect to the payment terminal 500, a "processing device," such as the processing device 520, may generally refer to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 520 may be configured to use the network communication interface 510 and/or the transceiver interface 515 to transmit and/or receive data and/or commands to and/or from the other devices that are visible in the contactless payment environment 300.

As used with respect to the payment terminal 500, a "memory device" may generally refer to a device or combination of devices that store one or more forms of computer-readable media for storing data and/or computer-executable program code/instructions. For example, in one embodiment, the memory device may include any computer memory that provides an actual or virtual space to temporarily or permanently store data and/or commands provided to the processing device when it carries out its functions described herein. In one embodiment, the memory device stores a transceiver application 555. The transceiver application 555 may work in conjunction with the previously described transceiver interface 515 to receive electronic payment vehicle data when the mobile device is held close to or tapped at the payment terminal. In some embodiments, the transceiver application 555 may also be configured to send data to the mobile device when the mobile device is held close to or tapped at the payment terminal.

As shown in FIG. 3, in some embodiments, a payment terminal is connected to a workstation 550 via the network 150. The workstation 550 may be used by the cashier or other personnel to interact with the payment terminal. The workstation 550 may include various features, such as a network communication interface, a processing device, a user interface, and a memory device.

As used with respect to the workstation 550, a "communication interface" may generally include a modem, server, transceiver, and/or other device for communicating with other devices on a network. The network communication interface may be a communication interface having one or more communication devices configured to communicate with one or more other devices on the network 350, such as the payment terminal, the processing system, other processing systems, data systems, etc.

As used with respect to the workstation 550, a "processing device" may generally refer to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device may be configured to use the network communication interface to transmit and/or receive data and/or commands to and/or from the other devices connected to the network 350.

As used with respect to the workstation 550, a "user interface" may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user or the cashier or output data to the user or the cashier. These input and output devices may include a display, mouse, keyboard, button, touchpad, touch screen, microphone, speaker, light, joystick, switch, and/or other customer input/output device for communicating with one or more customers. As used with respect to the workstation 550, a "memory device" may generally refer to a device or combination of devices that store one or more forms of computer-readable media for storing data and/or computer-executable program code/instructions. For example, in one embodiment, the memory device may include any computer memory that provides an actual or virtual space to temporarily or permanently store data and/or commands provided to the processing device when it carries out its functions described herein.

Thus, present embodiments of the invention disclosed in detail above provide systems, methods, and computer program products for making a payment at a payment terminal via a mobile device, regardless of whether a power source in the mobile device is present or active. As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present invention may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for making a payment comprising:
a first payment module configured to execute a first payment routine when a particular power source is both present in the apparatus and active, wherein the particular power source is active when the particular power source is able to supply power to the first payment module to execute the first payment routine, and wherein the first payment routine comprises transmitting to a payment terminal information about a payment vehicle stored in memory of the apparatus;
a switching module configured to execute a switching routine when a switching condition is detected, wherein the switching routine comprises activating a deactivated second payment module, and wherein the switching condition is based at least partially on current state of the particular power source; and
the second payment module configured to execute a second payment routine without a need for the particular power source, wherein the second payment routine comprises allowing information about a payment vehicle stored in memory of the apparatus to be transmitted to the payment terminal, wherein the switching module is configured to use a user interface of the apparatus to ask a user whether the user wants to activate the second payment module when the switching module detects the switching condition, the switching condition comprising the particular power source being discharged past a predefined level.

2. The apparatus of claim 1, wherein the first payment module is an active payment module that uses the particular power source to execute the first payment routine, and wherein the second payment module is a passive payment module that uses an electromagnetic field generated by the payment terminal to execute the second payment routine.

3. The apparatus of claim 1, further comprising the particular power source.

4. The apparatus of claim 1, wherein the apparatus comprises a mobile device and the particular power source comprises a primary battery for the mobile device.

5. The apparatus of claim 1, wherein the switching condition comprises the particular power source not being present, and wherein the switching module is configured to detect presence of the particular power source.

6. The apparatus of claim 1, wherein the switching condition comprises the particular power source being discharged or substantially discharged, and wherein the switching module is configured to detect when the particular power source is discharged or substantially discharged.

7. The apparatus of claim 1, further comprising:
a second power source different from the particular power source, wherein the second power source is used to power the second payment module.

8. The apparatus of claim 7, wherein the second power source comprises a photovoltaic power source.

9. The apparatus of claim 7, wherein the second power source comprises a backup battery.

10. The apparatus of claim 1, wherein the first payment module is configured to allow a user to select between multiple payment vehicles stored in memory of the apparatus, and wherein the second payment module is configured to use a default payment vehicle.

11. The apparatus of claim 1, wherein the first payment module is configured to run a graphical user interface that interacts with a user during the first payment routine, and wherein the second payment module does not run a graphical user interface and automatically allows for transmission of information about a payment vehicle when in close proximity to the payment terminal.

12. An apparatus for making a payment comprising:
a memory comprising information about one or more payment vehicles stored therein;
a user interface configured to present information to a user;
a transmitter configured to transmit information to a second apparatus;
an active module, executable by a processor, and configured to execute an active payment routine when a power source is both present in the apparatus and active, wherein the power source is active when the power source is able to supply power to the active module to execute the active payment routine, wherein the active payment routine comprises:
- allowing a payment vehicle to be selected by the user using the user interface; and
- transmitting to the second apparatus, using the transmitter, payment vehicle data associated with the selected payment vehicle;

a switching module, executable by a processor, and configured to execute a switching routine when a switching condition is detected, wherein the switching routine comprises activating a deactivated passive module; and a passive module configured to execute a passive payment routine when the power source is either not present in the apparatus or not active, wherein the passive payment routine comprises allowing payment vehicle data associated with a default payment vehicle to be transmitted using the transmitter to the second apparatus.

13. The apparatus of claim 12, wherein the active module is an active near-field communication (NFC) device.

14. The apparatus of claim 12, wherein the passive module is a passive near-field communication (NFC) device.

15. The apparatus of claim 12, wherein no power source in the apparatus supplies power to the passive module.

16. The apparatus of claim 12, wherein the second apparatus supplies power, via an electromagnetic field, to the passive module to execute the passive payment routine.

17. The apparatus of claim 12, wherein a photovoltaic power source in the apparatus supplies power to the passive module to execute the passive payment routine.

18. The apparatus of claim 12, wherein the power source is the only power source in the apparatus.

19. The apparatus of claim 12, wherein the active module and the passive module are integrated into a chip in the apparatus.

20. The apparatus of claim 19, wherein payment vehicle data associated with a plurality of payment vehicles is stored in a secure module, wherein the secure module is stored in a memory in the chip.

21. The apparatus of claim 19:
- wherein payment vehicle data associated with a plurality of payment vehicles is stored in a first secure module,
- wherein payment vehicle data associated with the default payment vehicle is stored in a second secure module, and
- wherein the first secure module and the second secure module are stored in a memory in the chip.

22. The apparatus of claim 12, wherein the active module is integrated into a first chip in the apparatus and the passive module is integrated into a second chip in the apparatus.

23. The apparatus of claim 22:
- wherein payment vehicle data associated with a plurality of payment vehicles is stored in a first secure module,
- wherein payment vehicle data associated with the default payment vehicle is stored in a second secure module,
- wherein the first secure module is stored in a memory in the first chip, and
- wherein the second secure module is stored in a memory in the second chip.

24. The apparatus of claim 12, wherein the default payment vehicle cannot be changed from a first payment vehicle to a second payment vehicle when the active module is not active.

25. The apparatus of claim 12, wherein in lieu of the passive module configured to allow payment vehicle data associated with a default payment vehicle to be transmitted, the passive module configured to allow an identifier associated with the passive module to be transmitted.

26. The apparatus of claim 12, further comprising a module configured to allow selection of the default payment vehicle, wherein the module configured to allow selection of the default payment vehicle comprises:
- the module configured to allow access to a look-up table, wherein the look-up table comprises payment vehicle data associated with a plurality of payment vehicles; and
- the module configured to allow selection of a payment vehicle to serve as the default payment vehicle.

27. A method for making a payment via a mobile device, the method comprising:
- executing a first payment routine by a first payment module in the mobile device when both a particular power source is present in the mobile device and the particular power source is active, wherein the particular power source is active when the particular power source is able to supply power to the first payment module to execute the first payment routine, and wherein the first payment routine comprises transmitting payment vehicle data associated with a payment vehicle;
- executing a second payment routine by a second payment module in the device when the particular power source is either not present in the mobile device or not active, wherein the second payment routine comprises allowing payment vehicle data associated with a default payment vehicle to be transmitted;
- executing a switching routine by a switching module in the mobile device when a switching condition is detected, wherein the switching routine comprises activating or deactivating at least one of the first payment module or the second payment module; and
- prompting, by the switching module in the mobile device via a user interface of the mobile device, whether a user wants to activate the second payment module when the switching module detects the switching condition, the switching condition comprising the particular power source being discharged past a predefined level.

28. The method of claim 27, wherein the first payment routine comprises an active payment routine, wherein the first payment module comprises an active payment module, wherein the second payment routine comprises a passive payment routine, and wherein the second payment module comprises a passive payment module.

29. The method of claim 27, wherein the first payment routine comprises an active payment routine, wherein the first payment module comprises an active payment module that is configured to be powered by the particular power source, wherein the second payment routine comprises a passive payment routine, and wherein the second payment module comprises a passive payment module configured to be powered by an electromagnetic field generated by a payment terminal.

30. The method of claim 27, further comprising:
- determining that the particular power source is not present or not active; and
- automatically switching the second payment module from a deactivated configuration to an activated configuration.

31. A method for making a payment via a device, comprising:
- executing an active payment routine by an active module in the device when both a power source is present in the device and the power source is active, wherein the power source is active when the power source is able to supply power to the active module to execute the active payment routine, wherein the active payment routine comprises allowing a payment vehicle to be selected and transmitting payment vehicle data associated with the selected payment vehicle;

executing a switching routine by a switching module in the device when a switching condition is detected, wherein the switching routine comprises activating a deactivated passive module; and executing a passive payment routine by a passive module in the device when the power source is either not present in the device or not active, wherein the passive payment routine comprises allowing payment vehicle data associated with a default payment vehicle to be transmitted.

32. The method of claim 31, wherein the switching routine further comprises:
deactivating the active module.

33. The method of claim 31, wherein the active module is an active near-field communication (NFC) device.

34. The method of claim 31, wherein the passive module is a passive near-field communication (NFC) device.

35. The method of claim 31, wherein no power source in the device supplies power to the passive module.

36. The method of claim 31, wherein an apparatus supplies power, via an electromagnetic field, to the passive module to execute the passive payment routine.

37. The method of claim 31, wherein a photovoltaic power source in the device supplies power to the passive module to execute the passive payment routine.

38. The method of claim 31, wherein the power source is the only power source in the device.

39. The method of claim 31, wherein the active module and the passive module are integrated into a chip.

40. The method of claim 39, wherein payment vehicle data associated with a plurality of payment vehicles is stored in a secure module, and wherein the secure module is stored in a memory in the chip.

41. The method of claim 39:
wherein payment vehicle data associated with a plurality of payment vehicles is stored in a first secure module,
wherein payment vehicle data associated with the default payment vehicle is stored in a second secure module, and
wherein the first secure module and the second secure module are stored in a memory in the chip.

42. The method of claim 31, wherein the active module is integrated into a first chip and the passive module is integrated into a second chip.

43. The method of claim 42:
wherein payment vehicle data associated with a plurality of payment vehicles is stored in a first secure module,
wherein payment vehicle data associated with the default payment vehicle is stored in a second secure module,
wherein the first secure module is stored in a memory in the first chip, and
wherein the second secure module is stored in a memory in the second chip.

44. The method of claim 31, wherein the default payment vehicle cannot be changed from a first payment vehicle to a second payment vehicle when the active module is not active.

45. The method of claim 31, wherein in lieu of allowing payment vehicle data associated with a default payment vehicle to be transmitted, allowing an identifier associated with the passive module to be transmitted.

46. The method of claim 31, further comprising allowing selection of the default payment vehicle, wherein allowing selection of the default payment vehicle comprises:

allowing access to a look-up table, wherein the look-up table comprises payment vehicle data associated with a plurality of payment vehicles; and
allowing selection of a payment vehicle to serve as the default payment vehicle.

47. A computer program product for making a payment via a device, the computer program product comprising a non-transitory computer-readable medium comprising:
a first set of code for configuring an active module to execute an active payment routine when a particular power source is both present in the device and active, wherein the particular power source is active when the particular power source is able to supply power to the active module to execute the active payment routine, wherein the active payment routine comprises allowing a payment vehicle to be selected and transmitting payment vehicle data associated with the selected payment vehicle to a payment terminal; and
a second set of code for deactivating the active module and activating a passive module based at least partially on availability and state of the particular power source, wherein the passive module is configured to execute a passive payment routine if the particular power source is either not present in the device or not active, and wherein the passive payment routine comprises allowing payment vehicle data associated with a default payment vehicle to be transmitted to a payment terminal.

48. The computer program product of claim 47, wherein the active module is an active near-field communication (NFC) device.

49. The computer program product of claim 47, wherein the passive module is a passive near-field communication (NFC) device configured to allow the payment vehicle data for the default payment vehicle to be transmitted using power generated from an electromagnetic field generated by a payment terminal in close proximity to the passive module.

50. The computer program product of claim 47, wherein the first set of code is further configured to present a graphical user interface to a user of the device to guide the user through the active payment routine.

51. The computer program product of claim 47, wherein the first set of code is configured to allow a user of the device to select a payment vehicle from a plurality of payment vehicles stored in the device.

52. The computing program product of claim 47, further comprising:
a set of code allowing user selection of the default payment vehicle.

53. An apparatus for making a payment comprising:
a first payment module configured to execute a first payment routine when a particular power source is both present in the apparatus and active, wherein the particular power source is active when the particular power source is able to supply power to the first payment module to execute the first payment routine, and wherein the first payment routine comprises transmitting to a payment terminal information about a payment vehicle stored in memory of the apparatus;
a switching module configured to execute a switching routine when a switching condition is detected, wherein the switching routine comprises activating a deactivated second payment module, and wherein the switching condition is based at least partially on current state of the particular power source;
the second payment module configured to execute a second payment routine without a need for the particular power source, wherein the second payment routine comprises allowing information about a payment vehicle stored in memory of the apparatus to be transmitted to the payment terminal; and a second power source different from the particular power source, wherein the second power source is used to power the second payment module, wherein the second power source comprises at least one of a photovoltaic power source or a backup battery.

54. An apparatus for making a payment comprising:

a first payment module configured to execute a first payment routine when a particular power source is both present in the apparatus and active, wherein the particular power source is active when the particular power source is able to supply power to the first payment module to execute the first payment routine, and wherein the first payment routine comprises transmitting to a payment terminal information about a payment vehicle stored in memory of the apparatus;

a switching module configured to execute a switching routine when a switching condition is detected, wherein the switching routine comprises activating a deactivated second payment module, and wherein the switching condition is based at least partially on current state of the particular power source; and the second payment module configured to execute a second payment routine without a need for the particular power source, wherein the second payment routine comprises allowing information about a payment vehicle stored in memory of the apparatus to be transmitted to the payment terminal, wherein the first payment module is configured to allow a user to select between multiple payment vehicles stored in memory of the apparatus, and wherein the second payment module is configured to use a default payment vehicle.

* * * * *